April 15, 1941.                H. ALLEN                    2,238,357
                    RESILIENTLY PACKED VALVE BODY
              Filed July 2, 1937              2 Sheets-Sheet 1

INVENTOR.
HERBERT ALLEN.
BY Jesse R. Stone
   Lester B. Clark
            ATTORNEYS.

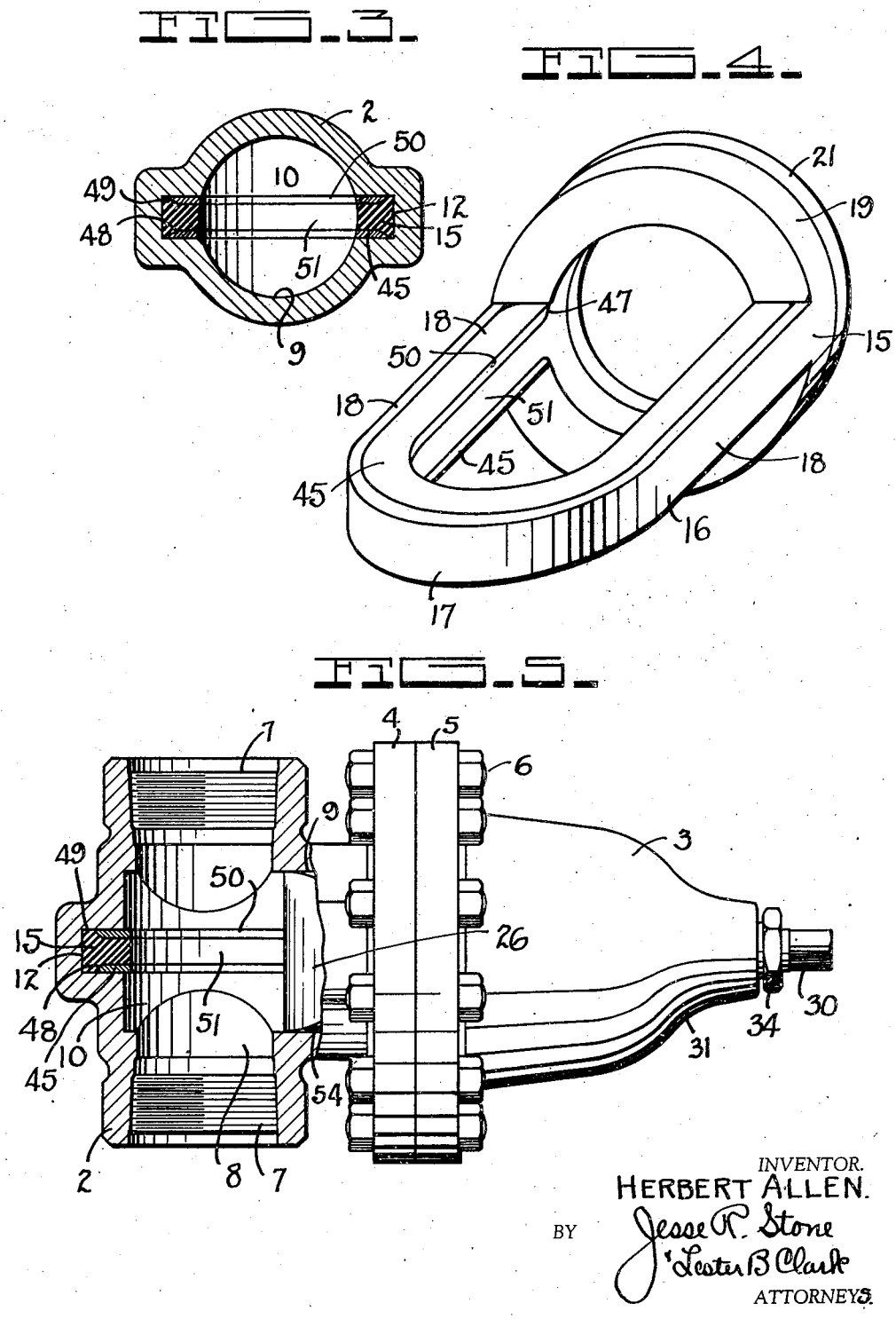

Patented Apr. 15, 1941

2,238,357

UNITED STATES PATENT OFFICE 2,238,357

RESILIENTLY PACKED VALVE BODY

Herbert Allen, Houston, Tex., assignor to Cameron Iron Works, Houston, Tex., a corporation Application July 2, 1937, Serial No. 151,656

8 Claims. (Cl. 251—167)

The invention relates to an improvement in valves particularly of a type wherein a resilient packing is disposed within the valve body and against which the valve member is to abut in such a manner that the pressure applied by the valve member will be uniformly distributed not only against the valve member but against the inside faces of the housing due to the fact that the resilient packing will flow under pressure.

In valves of the type wherein fluids under high pressure are to be controlled and particularly where these fluids carry abrasive materials, it has been found that where a small leak occurs the abrasive material soon cuts away the metal of the valve member or the valve seat so that it is impossible thereafter to obtain a seal with that valve. The present invention, therefore, directs itself to a valve wherein a uniform pressure can be applied at all points and in which a resilient packing member is provided so that any inequalities of the parts will be compensated for due to the uniform distribution of the pressure and so that the resilient material will flow into any space which is present and prevent leakage.

It is one of the objects of the invention to provide in combination with a valve body and valve member a resilient packing which will uniformly distribute the pressure and effect a seal with both the valve member and the valve body.

Another object of the invention is to provide a packing member within a valve body in such a manner that it is disposed in a groove and suitably confined so that pressure applied to it by the valve member will be uniformly distributed.

Another object of the invention is to provide a packing material for valves which has a substantially resilient body portion so that it may flow when pressure is applied to it by the valve member.

Another object of the invention is to confine a resilient packing in a valve member so that pressure may be applied thereto.

Still another object of the invention is to provide a valve packing having a U shaped portion with an annular ring or head integrally formed therewith.

A still further object of the invention is to provide a U shaped packing member having wear plates carried thereby so as to confine the packing and prevent wear thereof.

Other and further objects of the invention will be readily apparent when the following description is considered in connection with the accompanying drawings, wherein:

Fig. 3 is a section taken on the line 3—3 of Fig. 1.

Fig. 4 is a perspective view of the packing assembly ready for insertion in the valve member.

Fig. 5 is a side elevation of the valve in open position and showing certain parts in section to illustrate the arrangement of the packing and the valve member in the housing.

Figure 1:
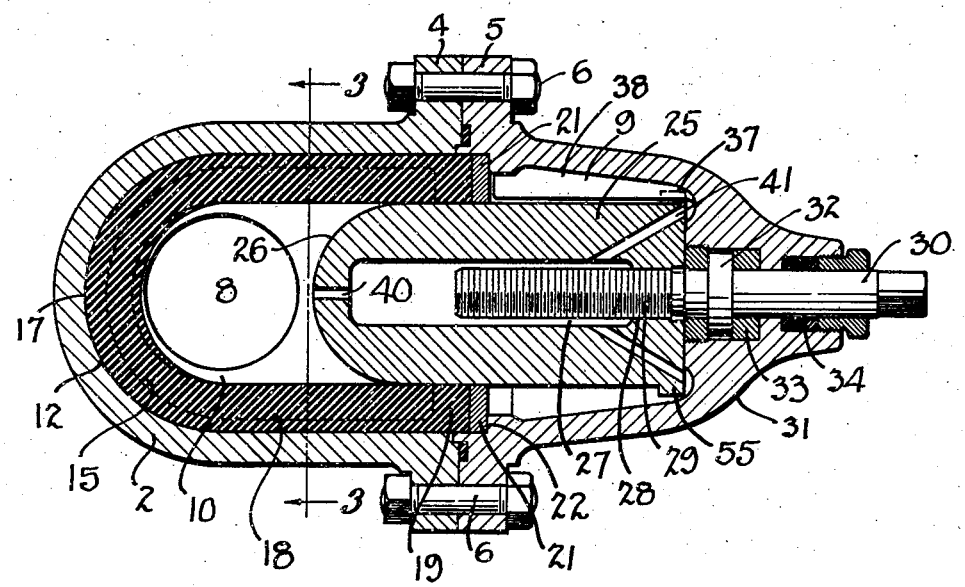
Figure 1 is a vertical sectional view transversely of the valve passage and showing the valve member in open position.

In Fig. 5 the valve generally is illustrated as being made up of a base portion 2 not the bonnet portion 3. The base 2 has a flange 4 and the bonnet 3 has a flange 5, which are arranged to abut and be clamped together by means of the bolts 6.

The base is shown in longitudinal section in Fig. 5 and is threaded at 7 in order to receive the pipe line connections.

The base 2 has the fluid passage 8 longitudinally thereof and this passage intersects with the valve chamber 9 which is formed in both the base and the body. The chamber 9 and passage 8 intersect in the enlarged area 10. The base 2 is of peculiar construction as will be seen from the sections in Figs. 1 and 5, in that it is formed with a lateral groove 12 which extends down along the sides of the base and around the body thereof at an elevation below the passage 8. This groove is of substantial width and is arranged to receive the packing assembly 15. This assembly is shown in perspective view in Fig. 4 and is made up of a base which comprises a U shaped portion 16 having a curved lower end 17 and the side leg portions 18. Adjoining the upper end of the leg portions 18 is an annular ring or head 19 which is positioned transversely of the legs, as seen in Fig. 4.

Fig. 1 shows the section longitudinally of the packing assembly and illustrates the manner in which the base 17 and the legs 18 are disposed within the groove 15 in the base. The head portion 19 is disposed partly in the base 2 and partly in the bonnet 3. The upper edge of this head 19 carries a retainer plate 21 which abuts against a shoulder 22 formed in the bonnet so that when the bolts 6 are drawn up tightly the packing assembly will be clamped firmly in position and sufficient pressure applied thereto to hold it securely against movement. Retainer plate 21 serves to confine the head portion 19 so that it cannot flow upwardly into the upper portion of the valve chamber 9.

It seems obvious that this packing assembly can be inserted in the base 2 and the bonnet 3 then clamped in position.

The bonnet 3 carries the valve member 25 which is here shown in the form of a cylinder ram or body whose lower end is rounded at 26, as seen in Fig. 5. This curved surface is longitudinally of the base 2 and is seen in section in Figs. 1 and 2.

This valve member 25 is internally recessed at 27 and has one end of this recess threaded at 28 in order to receive the threaded portion 29 of the stem 30. This stem is rotatably mounted within the top 31 of the bonnet 3 by having a flange 32 thereon affixed between the retainer rings 33. A suitable stuffing box 34 is positioned around the stem of the valve and the end 35 thereof is of non-circular configuration in order to receive a hand wheel or lever by which the stem will be rotated. The upper portion of the body 25 carries the wing 37 which is arranged to abut against a rib 38 so as to prevent rotation of the valve member due to rotation of the stem 33. A vent 40 extends from the recess 27 through the lower end of the valve to relieve any suction or compression within the packing upon movement of the valve. This recess 27 is in turn vented by the passages 41 into the valve chamber 9.

As seen in Fig. 4, a metal plate 45 is positioned on each side of the leg portions 18 of the packing assembly. These plates are of U shape to correspond with the shape of the base 16 and are preferably vulcanized or otherwise attached to the rubber so that they are carried thereby and are in fact floating upon the rubber. The upper ends of these plates may be beveled at 47 if desired. As seen in Fig. 5, these plates extend into the intersection 10 beyond the confines of the groove 12 and tend to confine the resilient rubber material of the packing. The inside end 48 of each of these plates is also beveled in such a manner that there is an enlarged area 49 of packing material in the base of the groove 12.

Figure 2:
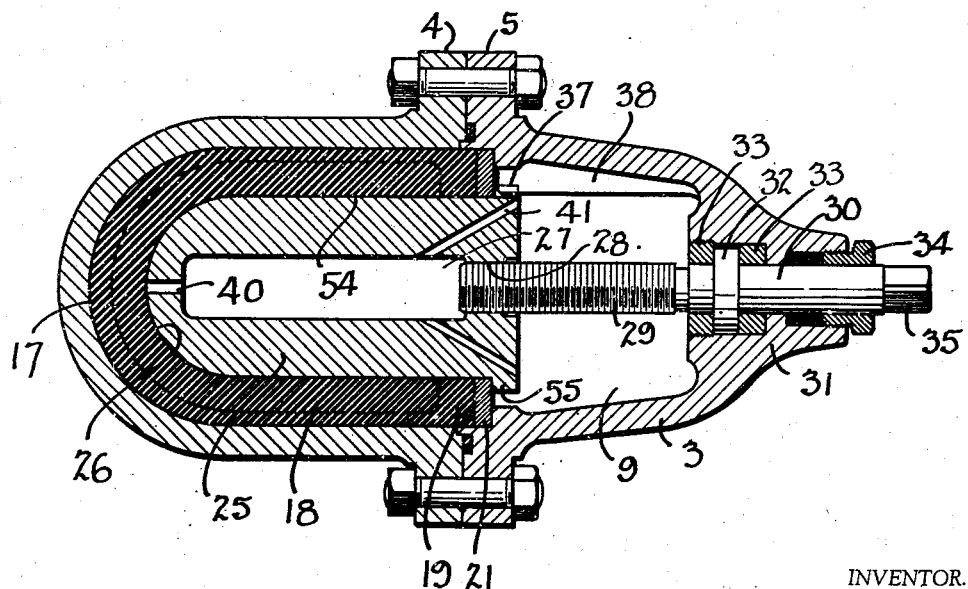
Fig. 2 is a similar section showing the valve in closed position.

This arrangement of the wearing plates is provided so that when the valve member 25 moves to closed position, as seen in Fig. 2, the periphery of the valve member will abut against the inside edges or faces 50 of these wearing plates. As the stem 30 is further rotated, additional movement of the valve member will occur and in this manner pressure is applied to the face 51 of the packing and the faces 50 of the wear plates. This, of course, tends to move the wear plates against the packing by moving the beveled portions 48 against the enlarged area 49 which is confined within the groove. This, of course, will tend to displace the resilient packing material and drive it forwardly between the plates so that in this manner due to the resiliency of the packing material a uniform pressure will be distributed throughout the packing body. This pressure caused by the lower end 26 of the valve member abutting against the packing will be distributed upwardly along the legs 18 and even to the head 19. This distribution of pressure will create a seal along the sides 54 of the valve member so that it will be impossible for any leakage to occur. It will be noted also that the valve member 25 has an enlarged area or flange 55 on its upper end which is arranged to abut against the retainer ring 21 as the valve member moves to closed position. In this manner the additional pressure will be applied to the head 19 so as to effect a seal with the valve member on the inside of the valve body. This additional pressure also closes the joint between the flanges 4 and 5 so that it is impossible for any leakage to occur either around the lower end of the valve member or between the valve body and the packing.

The broad idea of the packing confined by a pair of floating reenforcing or retaining plates is not claimed broadly in the present application but is claimed in the applicant's copending application Serial No. 242,123, filed November 23, 1938.

Broadly the invention contemplates a resilient packing through which the pressure may flow in order to obtain a uniform sealing pressure against both the valve body and the valve member.

What is claimed is:

1. A valve comprising a base, a bonnet thereon, both said base and bonnet being recessed to form a vertical cylindrical valve chamber, a passage transversely thereof, a cylindrical valve member, means to move said member longitudinally of said chamber to cover or uncover said passage, a groove in said base extending down the sides thereof and around the bottom of the chamber below the elevation of said passage, a resilient packing disposed in said groove and to be abutted by said valve member when it moves to cover said passage so as to form a seal of uniform pressure at all points due to the flowing of said resilient packing, and a wear plate carried by the exposed edges of said packing so as to confine the packing when said valve member contacts said plates in applying pressure to said packing.

2. A valve comprising a base, a bonnet thereon, both said base and bonnet being recessed to form a vertical cylindrical valve chamber, a passage transversely thereof, a cylindrical valve member, means to move said member longitudinally of said chamber to cover or uncover said passage, a groove in said base extending down the sides thereof and around the bottom of the chamber below the elevation of said passage, a resilient packing disposed in said groove and to be abutted by said valve member when it moves to cover said passage so as to form a seal of uniform pressure at all points due to the flowing of said resilient packing, said packing including an annular head portion at its top surrounding said chamber, a retainer ring on said head to confine said head, and a shoulder on said valve member to abut said ring and effect a seal about said member and against said base to completely seal off around said valve member.

3. A valve body comprising a base and top, a longitudinal groove around the inside of said base, a shoulder about the inside lower portion of said top, a resilient packing having a U shaped portion to fit said groove and an annular head transversely thereof to receive said shoulder, means to connect said base and top to confine said head, a valve member movable to close the valve and effect a seal with the body by contacting said packing, and means on the valve to contact said head to also apply pressure to said packing.

4. A valve packing comprising a U shaped leg portion and a unitary annular head portion transversely of the tops of the legs, and a wear plate carried by the front and rear faces of said leg portion.

5. A valve packing comprising a U shaped leg portion and a head portion transversely joining the tops of the legs, and a wear plate carried by the front and rear faces of said leg portion around the inside edge.

6. A valve packing comprising a U shaped leg portion and an annular head portion transversely of the tops of the legs, a wear plate carried by the front and rear faces of said leg portion around the inside edge, and a retainer ring on the top of said head.

7. A valve of the character described comprising a body, a valve member, a resilient packing carried by said body, plates floating on said packing, means on said valve member to apply pressure to said plates to effect flowing of said packing to provide a uniform sealing pressure against said body and said valve, and means to vent said valve member as it moves to sealing or unsealing position.

8. A valve packing comprising a substantially U-shaped leg portion, and an annular head portion transversely joining the tops of the legs, and rigid plates carried by said first portion to completely confine the packing when subjected to pressure.

HERBERT ALLEN.